(12) United States Patent
Wellig

(10) Patent No.: US 12,111,382 B2
(45) Date of Patent: *Oct. 8, 2024

(54) METHODS AND SYSTEMS FOR IMPROVING TARGET DETECTION PERFORMANCE OF AN INDOOR RADAR SENSOR

(71) Applicant: Honeywell International Inc., Charlotte, NC (US)

(72) Inventor: Armin Wellig, Mont-sur-Rolle (CH)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,765

(22) Filed: Apr. 18, 2023

(65) Prior Publication Data

US 2023/0251365 A1 Aug. 10, 2023

Related U.S. Application Data

(63) Continuation of application No. 16/908,444, filed on Jun. 22, 2020, now Pat. No. 11,662,449.

(51) Int. Cl.
*G01S 13/04* (2006.01)
*G01S 13/06* (2006.01)
(Continued)

(52) U.S. Cl.
CPC .............. *G01S 13/04* (2013.01); *G01S 13/06* (2013.01); *G01S 13/56* (2013.01); *G01S 13/58* (2013.01);
(Continued)

(58) Field of Classification Search
CPC . G01S 7/415; G01S 7/23; G01S 13/56; G01S 13/04; G01S 13/726; G01S 13/06; G01S 13/58
(Continued)

(56) References Cited

U.S. PATENT DOCUMENTS 4,197,537 A 4/1980 Follen et al.
6,250,601 B1 6/2001 Kolar et al.
(Continued)

FOREIGN PATENT DOCUMENTS

CN 104991232 A 10/2015
CN 110456343 A 11/2019
(Continued)

OTHER PUBLICATIONS

Zhang et al., "Real-Time Human Motion Behavior Detection via CNN Using mmWave Radar," IEEE Sensors Council, 4 pages, Feb. 2019.
(Continued)

*Primary Examiner* — Vladimir Magloire
*Assistant Examiner* — Michael W Justice
(74) *Attorney, Agent, or Firm* — Seager, Tufte & Wickhem, LLP

(57) ABSTRACT

A computer assisted method for processing output from a mmWave sensor to derive a more reliable count of people in a room, zone or space being monitored by the sensor. In some examples, damping is applied to a varying "people count" signal from the sensor. The damping reduces volatility of the people count and avoids counting anomalous false positive detections. When the people count value decreases, damping may be applied more heavily to disregard intermittent false negatives where the sensor momentarily fails to detect an actual person. In some examples, the mmWave sensor provides point clouds representing the approximate shape and location of detected apparent objects, some of which may be people. Some example methods define digital targets corresponding to the point clouds. The targets are deemed to represent real people if the objects and their corresponding targets have sufficient lifes-
(Continued)

pan and exhibit movement within a predetermined normal range.

20 Claims, 10 Drawing Sheets

(51) Int. Cl.
*G01S 13/56* (2006.01)
*G01S 13/58* (2006.01)
*G06F 18/24* (2023.01)
*G06V 10/147* (2022.01)
*G06V 20/13* (2022.01)
*G06V 20/52* (2022.01)
*G06V 20/64* (2022.01)

(52) U.S. Cl.
CPC ............ *G06F 18/24* (2023.01); *G06V 10/147* (2022.01); *G06V 20/13* (2022.01); *G06V 20/53* (2022.01); *G06V 20/64* (2022.01)

(58) Field of Classification Search
USPC .......................................................... 342/28
See application file for complete search history.

(56) References Cited

U.S. PATENT DOCUMENTS

| | | |
|---|---|---|
| 6,677,887 B2 | 1/2004 | Harman |
| 6,720,874 B2 | 4/2004 | Fufidio et al. |
| 6,993,309 B2 | 1/2006 | Tsujishita et al. |
| 7,218,208 B2 | 5/2007 | Kikuchi |
| 7,466,224 B2 | 12/2008 | Ward et al. |
| 7,978,083 B2 | 7/2011 | Melker et al. |
| 8,395,515 B2 | 3/2013 | Tokhtuev et al. |
| 8,742,935 B2 | 6/2014 | Cuddihy et al. |
| 10,354,503 B1 | 7/2019 | Kostrun et al. |
| 10,402,631 B2* | 9/2019 | Wang ..................... G06T 7/11 |
| 10,936,859 B2* | 3/2021 | Wang ..................... G06V 20/53 |
| 11,037,067 B2 | 6/2021 | Holliday et al. |
| 11,079,482 B2 | 8/2021 | Xiong et al. |
| 11,127,144 B2* | 9/2021 | Steiner ................... G01S 5/0294 |
| 11,657,650 B2* | 5/2023 | Wang ..................... G06V 40/20 |
| | | 382/103 |
| 2002/0055346 A1 | 5/2002 | Tsujishita et al. |
| 2002/0060639 A1 | 5/2002 | Harman |
| 2005/0174222 A1 | 8/2005 | Kikuchi |
| 2009/0237651 A1 | 9/2009 | Arndt et al. |
| 2010/0103019 A1 | 4/2010 | Ammar |
| 2013/0002434 A1 | 1/2013 | Cuddihy et al. |
| 2018/0106897 A1 | 4/2018 | Shouldice et al. |
| 2018/0120412 A1 | 5/2018 | Kim |
| 2018/0375444 A1 | 12/2018 | Gamroth |
| 2019/0012607 A1 | 1/2019 | Holliday et al. |
| 2019/0019017 A1* | 1/2019 | Wang ..................... G06F 16/55 |
| 2019/0049570 A1 | 2/2019 | Xiong et al. |
| 2019/0227156 A1 | 7/2019 | Santra et al. |
| 2019/0228624 A1 | 7/2019 | Kostrun et al. |
| 2019/0295386 A1 | 9/2019 | Roberts |
| 2020/0074157 A1* | 3/2020 | Wang ..................... G06F 16/55 |
| 2020/0082551 A1* | 3/2020 | Steiner ................... G01S 13/867 |
| 2021/0133491 A1* | 5/2021 | Wang ..................... G06V 40/23 |
| 2021/0166006 A1* | 6/2021 | Wang ................. G07C 9/00896 |
| 2021/0383556 A1* | 12/2021 | Steiner ................. H05B 47/105 |
| 2023/0258502 A1* | 8/2023 | Sarasmo ............... G01J 5/0846 |
| | | 374/121 |
| 2023/0274579 A1* | 8/2023 | Wang ..................... G07C 9/00 |
| | | 382/103 |

FOREIGN PATENT DOCUMENTS

| | | |
|---|---|---|
| JP | 5862023 B2 | 2/2016 |
| KR | 101095017 B1 | 12/2011 |
| WO | 2020113441 A1 | 6/2020 |
| WO | 2020154962 A1 | 8/2020 |

OTHER PUBLICATIONS

"A Sensor Above the Rest," VAYYAR, 6 pages, accessed Oct. 7, 2020.

* cited by examiner

FIG. 8

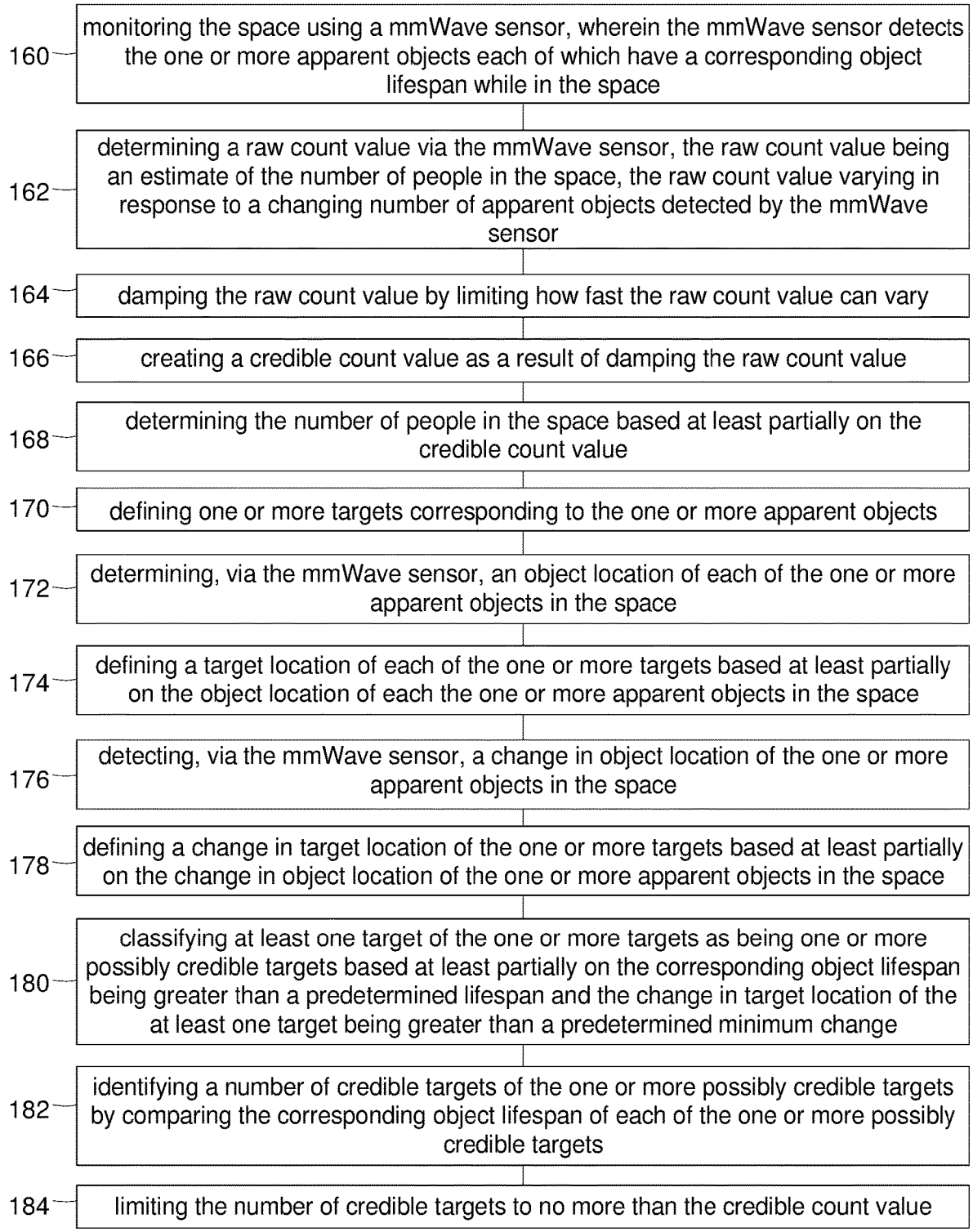

160 — monitoring the space using a mmWave sensor, wherein the mmWave sensor detects the one or more apparent objects each of which have a corresponding object lifespan while in the space 162 — determining a raw count value via the mmWave sensor, the raw count value being an estimate of the number of people in the space, the raw count value varying in response to a changing number of apparent objects detected by the mmWave sensor 164 — damping the raw count value by limiting how fast the raw count value can vary 166 — creating a credible count value as a result of damping the raw count value 168 — determining the number of people in the space based at least partially on the credible count value 170 — defining one or more targets corresponding to the one or more apparent objects 172 — determining, via the mmWave sensor, an object location of each of the one or more apparent objects in the space 174 — defining a target location of each of the one or more targets based at least partially on the object location of each the one or more apparent objects in the space 176 — detecting, via the mmWave sensor, a change in object location of the one or more apparent objects in the space 178 — defining a change in target location of the one or more targets based at least partially on the change in object location of the one or more apparent objects in the space 180 — classifying at least one target of the one or more targets as being one or more possibly credible targets based at least partially on the corresponding object lifespan being greater than a predetermined lifespan and the change in target location of the at least one target being greater than a predetermined minimum change 182 — identifying a number of credible targets of the one or more possibly credible targets by comparing the corresponding object lifespan of each of the one or more possibly credible targets 184 — limiting the number of credible targets to no more than the credible count value

FIG. 9

186 — decreasing the credible count value in response to the corresponding credible object being undetected by the mmWave sensor for at least a predetermined period of time while a most recent target location of the credible target was at a predetermined exit zone of the space 188 — leaving the credible count value unaffected in response to the corresponding credible object being currently undetected by the mmWave sensor while the most recent target location of the credible target is outside the predetermined exit zone of the space 190 — assigning a confidence score to each of the one or more possibly credible targets of the plurality of targets, wherein the confidence score is based at least partially on the corresponding object lifespan and the change in target location being within a predetermined acceptable range 192 — factoring the confidence score into consideration when limiting the number of credible targets to no more than the credible count value 194 — measuring a plurality of time durations of the plurality of separate time periods 196 — deriving a total accumulated time by adding up the plurality of time durations, wherein the confidence score is further based on the total accumulated time 198 — determining the space is occupied when the mmWave sensor detects the one or more apparent objects in the space for at least a first predetermined duration of time 200 — determining the space is no longer occupied when the mmWave sensor no longer detects the one or more apparent objects in the space for at least a second predetermined duration of time, wherein the first predetermined duration of time is less than the second predetermined duration of time

FIG. 11

220 — monitoring the space using an indoor radar sensor, wherein the indoor radar sensor detects one or more apparent objects in the space each of which have a corresponding object lifespan while in the space 222 — determining when one or more of the apparent objects corresponds to a ghost object that is not actually present in the space 224 — determining when an object that is actually present in the space no longer has a corresponding apparent object detected by the indoor radar sensor 226 — determining the number of people in the space based at least partially on a number of the one or more apparent objects in the space, a number of apparent objects that are determined to be ghost objects, and a number of objects that are determined to be actually present in the space but no longer have a corresponding apparent object

METHODS AND SYSTEMS FOR IMPROVING TARGET DETECTION PERFORMANCE OF AN INDOOR RADAR SENSOR

This is a continuation of co-pending U.S. patent application Ser. No. 16/908,444, filed Jun. 22, 2020, and entitled "METHODS AND SYSTEMS FOR IMPROVING TARGET DETECTION PERFORMANCE OF AN INDOOR RADAR SENSOR", which is incorporated herein by reference.

TECHNICAL FIELD

The disclosure relates generally to indoor radar sensors, and more particularly to methods and systems for improving target detection performance of an indoor radar sensor.

BACKGROUND

A space in a building can be monitored with an indoor radar sensor to detect the presence and/or activity of people in the space. Indoor radar sensors, such as mmWave (millimeter wave) sensors available from Texas Instruments and Vayyar, are currently available on the market. Such indoor radar sensors are able to output information such as the approximate number of detected objects (e.g. people), point clouds representing the general shape of detected objects, and coordinate locations of the objects. Indoor radar sensors can help protect people's privacy by providing non-video based surveillance of a space.

SUMMARY

The present disclosure generally pertains to a computer assisted method for processing output from an indoor radar sensor to derive a more reliable count of the people in a room, zone or space being monitored by the sensor. In some examples, damping is applied to a varying "people count" signal from the sensor. The damping, when used, reduces the volatility of the people count signal and avoids counting anomalous false positive detections. When the people count value decreases, damping may be applied more heavily to disregard intermittent false negatives where the sensor momentarily fails to detect a person in the space. In some examples, the indoor radar sensor provides point clouds representing the approximate shape and location of detected apparent objects, some of which may be people. Some example methods define digital targets corresponding to the point clouds. The targets are deemed to represent real people if the objects and their corresponding targets have sufficient lifespan and/or exhibit movement within a predetermined normal range.

In some examples of the disclosure, a method for determining a number of people in a space includes monitoring the space with a mmWave sensor. The mmWave sensor monitors the space to detect one or more apparent objects, each of which have a corresponding lifespan while in the space. The mmWave sensor determines a raw count value, which is an estimate of the number of people in the space. The raw count value is dependent on the number of apparent objects detected by the mmWave sensor. Of the apparent objects, one or more credible objects are identified based at least partially on the corresponding lifespan of the credible objects being greater than a predetermined minimum lifespan. Of the apparent objects, one or more false objects are identified based at least partially on the corresponding lifespan of the false objects being equal to or less than the predetermined minimum lifespan. The credible objects are counted, thus creating a credible count value. The credible count value is less than the raw count value due to one or more false objects. The number of people in the space is determined based at least partially on the credible count value.

In some examples of the disclosure a method for determining a number of people in a space includes monitoring the space using an indoor radar sensor. In some examples, the indoor radar sensor detects one or more apparent objects in the space. Each of the apparent objects have a corresponding object lifespan while in the space. The method includes determining when one or more of the apparent objects corresponds to a ghost object (false positive) that is not actually present in the space. The method further includes determining when an object that is actually present in the space no longer has a corresponding apparent object detected by the indoor radar sensor. The number of people in the space is determined at least partially based on a number of apparent objects in the space, a number of apparent objects that are determined to be ghost objects, and a number of objects that are determined to be actually present in the space but no longer have a corresponding apparent object.

In some examples of the disclosure a method for determining a number of people in a space includes using a mmWave sensor to monitor the space. In some examples, the mmWave sensor detects one or more apparent objects in the space. The space is determined to be occupied when the mmWave sensor detects one or more apparent objects being in the space for at least a first predetermined duration of time. The space is determined to be unoccupied when the mmWave sensor no longer detects any apparent objects in the space for at least a second predetermined duration of time, wherein the first predetermined duration of time is less than the second predetermined duration of time. Counting the apparent objects in the space when the space is occupied, thereby creating a count value. The number of people in the space is determined at least partially on the count value.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which:

FIG. 8 is a flow diagram showing yet another example method for determining a number of people in a space;

FIG. 9 is a flow diagram showing additional method steps for determining a number of people in a space.

FIG. 11 is a flow diagram showing another example method for determining a number of people in a space.

Figure 1:
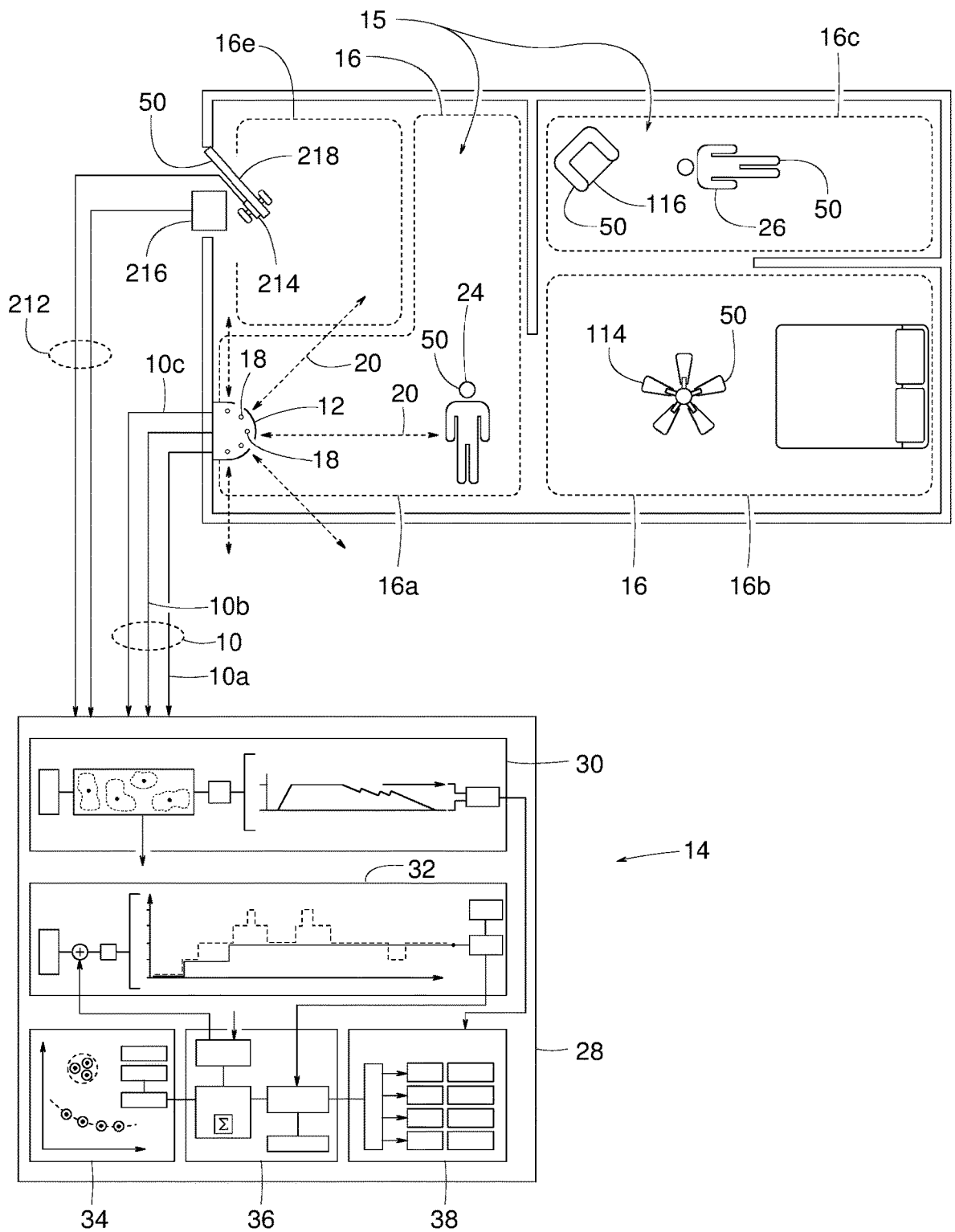
FIG. 1 is a schematic block diagram of an example indoor radar analyzing system.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

In some examples, the disclosure pertains to indoor radar sensors, and more particularly to methods and systems for improving target detection performance of an indoor radar sensor. This includes methods for accurately determining the number of people in a space and their location in the space without having to collect any visual data. In some examples, a mmWave sensor may be used as an indoor radar sensor. An example mmWave sensor provides multiple outputs that may include (1) a raw count value (estimate of the number of people in the space), (2) one or more point clouds identifying the approximate shape of apparent objects detected by the mmWave sensor, and (3) raw coordinate locations of the detected apparent objects. In some examples, such information from the mmWave sensor may be unreliable due to intermittent false positive and false negative detections. A false positive is when the sensor mistakenly detects a "ghost" or apparent object that does not represent a real person or does not even really exist. A false negative is when the sensor discontinues detecting a real object or person that actually does exist in the space.

In some examples, the method may identify credible objects (real people) based on the apparent object's lifespan or duration in which the apparent object is detected. In some examples, the identification of credible objects is further based on detecting objects exhibiting normal movement. In some examples, the analyzing system rates or ranks the objects in order of their likelihood of actually existing, again based on the object's movement and the object's lifespan or accumulated lifespan in the case of intermittently appearing objects. The objects that have a sufficiently high rating are identified as credible targets. In some cases, the number of objects or targets deemed credible is limited to no more than a credible count value of the people in the space.

In some examples, a relatively steady, reliable count value is derived from a more volatile raw count value provided by the mmWave sensor. The raw count value may vary erratically due to intermittent false positives and negatives. In some examples, the system applies damping to the raw count value to achieve a calmer, more credible count value. In some examples, the system applies damping more heavily on decreasing raw count values than on increasing ones because it is virtually impossible, of course, for a real person to suddenly vaporize and disappear. The dampening may be in the form of a hysteresis.

In some examples, the system creates a coordinate based map that represents a monitored space with separate zones. In some examples, based on the point cloud and the coordinate locations provided by the mmWave sensor, the system determines in which zones the credible objects exist. In some examples, the system converts the raw coordinate locations from the mmWave sensor to a more suitable coordinate system that matches the zones defined by the map.

FIG. 1 is a schematic diagram illustrating one example system 14. System 14 provides a method for analyzing a plurality of output signals 10 from a mmWave sensor 12 that is monitoring conditions of a space 15 (e.g., one or more rooms with one or more zones). Examples of space 15 include a hotel room, a hotel room suite, a hallway, a cabin in a ship, a restroom, a hospital room, a classroom, an office, a stairway, and/or any other suitable space.

In some examples, the term, "mmWave sensor" (millimeter wave sensor) refers to any electronic device that includes one or more transceivers plus means for processing incoming signals received as a result of electromagnet radiation emitted from the transceivers being reflected back to the transceivers, wherein the electromagnetic radiation is at a frequency of 24 to 100 GHz. Some example mmWave sensors operate near the middle or upper half of the 24 to 100 GHz range, e.g., 60 to 80 GHz. Operating at such frequencies avoids problems often associated with visual monitoring at higher frequencies. Some examples of mmWave sensor include model IWR6843 by Texas Instruments of Dallas Texas and various beta-testable units provided by Vayyar of Yehud, Israel. While a mmWave sensor is used as an example, it is contemplated that any indoor radar sensor may be used.

In the examples shown in FIG. 1, space 15 can be divided into multiple zones 16 including a zone-A 16a, a zone-B 16b, a zone-C 16c, and an exit zone 16e. The mmWave sensor 12 is mounted at a location where the sensor's plurality of mmWave transceivers 18 can emit and receive a corresponding plurality of mm Wave beams 20 to cover substantially the entire area of space 15. In response to receiving beams 20 reflected off of various surfaces in space 15, sensor 12 generates output signals 10. Some examples of signals 10 include a point cloud signal 10a, a raw people count 10b, and an object location signal 10c.

Figure 2:
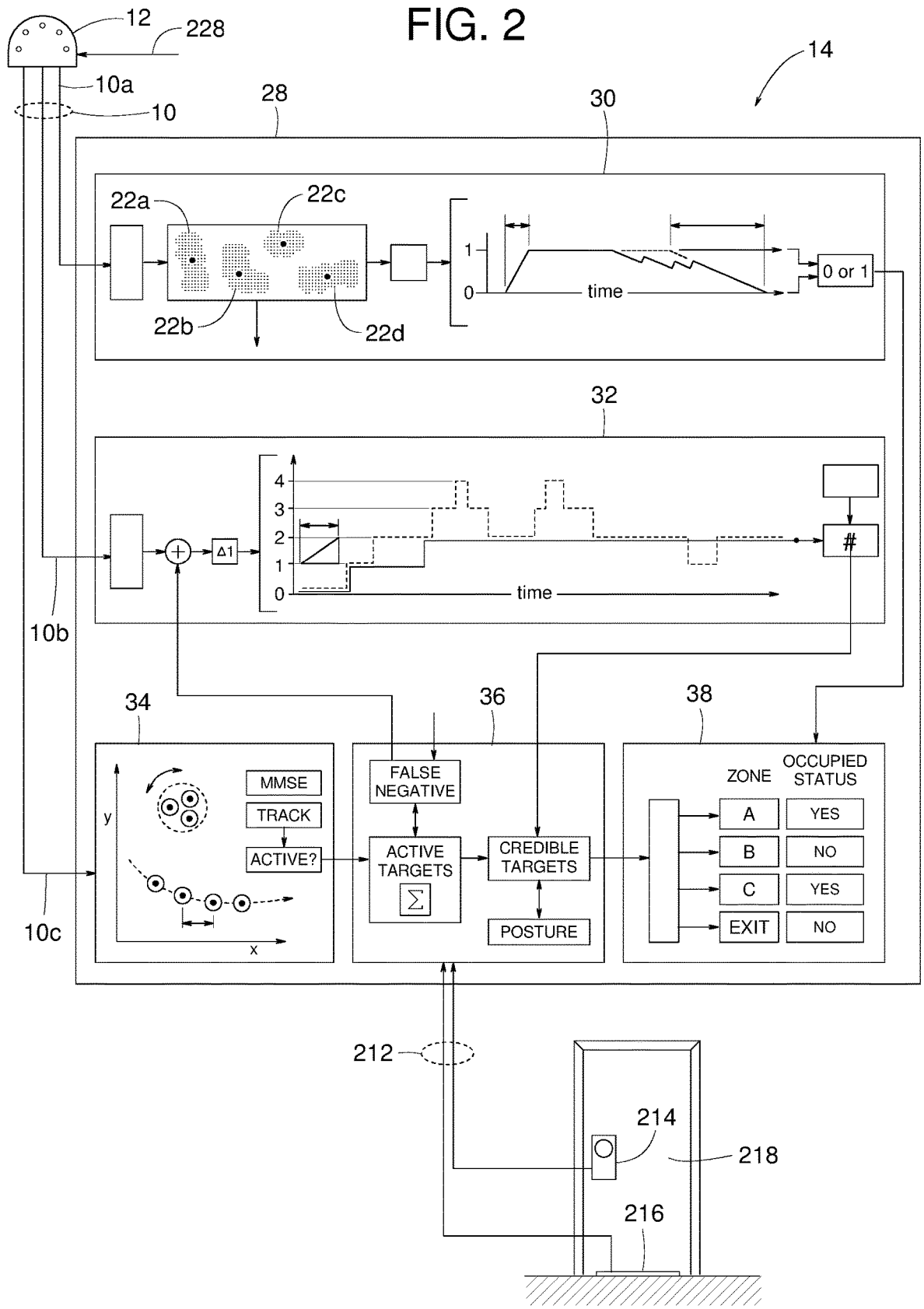
FIG. 2 is another schematic block diagram of the example indoor radar analyzing system shown in FIG. 1.

Point cloud signal 10a provides a point cloud 22 of each apparent object detected by sensor 12 (see FIG. 2). The term, "point cloud" refers to a collection of data points in a coordinate system to represent the shape of some apparent object. As some examples, a point cloud 22a may represent an upright person 24 in zone-A, a point cloud 22b may be the result of detecting a false positive (e.g., an anomalous reflection), a point cloud 22c may represent a ceiling fan in zone-B, and a point cloud 22d may represent a person 26 doing pushups in zone-C 16c.

Raw people count 10b is an output from mmWave sensor 12 that roughly indicates the number of apparent objects or people in space 15. Object location signal 10c provides location data (e.g., via coordinates) on the apparent objects or people detected by mmWave sensor 12.

The outputs from some examples of mmWave sensor 12 are meant for "stateless" or general purpose applications where specific information on space 15 is unknown or not well defined. That is, the domain-specific conditions and use case details to be addressed by the indoor radar sensor may not be known/leveraged by the "stateless" algorithm provided by the supplier and thus may not leverage the full potential to optimize the detection performance. The present system 14 may derive more meaningful information from outputs 10 of mmWave sensor 12 by using state information of the space.

To this end, some examples of the present system 14 include a computer 28 with programmed modules for executing various algorithms. Some examples of such modules include an Occupancy module 30, a People Count module 32, a Likely Target Tracking module 34, a Target Selection module 36, and a Zoning module 38. Dividing the overall control scheme of the system 14 into modules makes system 14 easier to understand and code. It should be appreciated by those of ordinary skill in the art, however, that the functions of the various modules can be redistributed among the modules, assigned to different or additional modules, consolidated into fewer modules, or even combined into a single algorithm. In some examples, the modules exchange information and share common functions.

Figure 3:
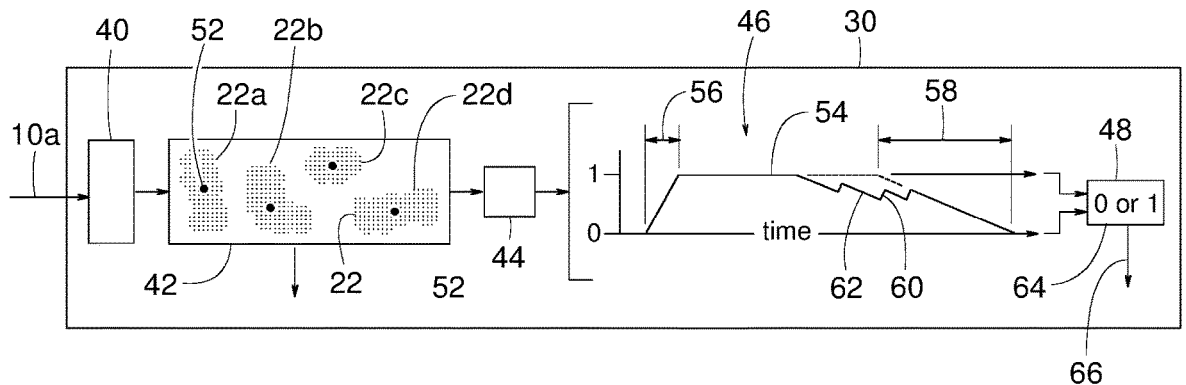
FIG. 3 is a schematic block diagram of an example Occupancy module used in some examples of a mmWave output analyzing system.

Referring further to FIGS. 2 and 3, some examples of Occupancy module 30 are for determining whether space 15 and/or individual zones 16 are occupied or not. In some examples, Occupancy module 30 includes a sampling block 40, a point cloud data base 42, a point cloud counter 44, an occupancy analyzer 46, and an occupancy indicator 48. Sampling block 40 samples point cloud signal 10a from mmWave sensor 12. In some examples, mmWave sensor 12 operates at a relatively high frame rate (e.g., 15 frames/sec) for processing lots of data and capturing rapidly changing conditions in space 15. Sampling block 40 and/or other parts of system 14, however, can operate at a much slower frame rate (e.g., about 2 frames/sec) to achieve the desired end goal without requiring excessive computing power and filtering out unwanted noise. So, a relatively inexpensive microcontroller (microprocessor, processor, etc.) can be used as computer 28.

Sampling block 40 conveys the information of point cloud signal 10a to point cloud data base 42. Point cloud data base 42 is used for identifying distinct point clouds 22 corresponding to apparent objects 50 detected by mmWave sensor 12. Point cloud data base 42, in some examples, may also be used for identifying centerpoint coordinate locations 52 of individual point clouds 22. In some examples, the shape of point clouds 22 may also indicate the orientation or posture of apparent objects 50.

Point cloud counter 44 counts the number of point clouds 22 in data base 42. In the illustrated example, there are four point clouds 22. In some examples, however, point cloud counter 44 can only count up to one. So, anything over zero is considered a one. Otherwise, the count is assigned a value of zero. Depending on the count, point cloud counter 44 conveys either a one or zero to occupancy analyzer 46.

The function of occupancy analyzer 46 is shown as a curve 54 plotted over time (x-axis) with an amplitude (y-axis) having a value of zero to one. "One" means space 15 (and/or in some examples zone 16) is occupied. Less than "one" means space 15 (and/or zone 16) is unoccupied. While the count provided by point cloud counter 44 can switch suddenly between one and zero, damping is applied to curve 54. Less damping is applied to curve 54 when curve 54 is rising toward one. More damping is applied to curve 54 when curve 54 is decreasing toward zero. Less damping results in a more rapid ascent (steeper slope), as indicated by a relatively shorter time period 56 (e.g., one second) for curve 54 to indicate that space 15 is occupied. More damping results in a more gradual descent (shallower slope), as indicated by a relatively longer time period 58 (e.g., 60 to 90 seconds) for curve 54 to indicate that space 15 is no longer occupied. In some cases, as shown in the illustrated example, an apparent object (e.g. body) 50 may seem to have generally disappeared and so curve 54 descends During the descent, however, the apparent body might briefly and intermittently reappear, which results in curve 54 descending in a saw tooth pattern with alternating periods of steep 60 and shallow slope 62. In some examples, the slope parameters of curve 54 during the steep and shallow slope periods 60 and 62 may be tuned or adjusted independently of each other (e.g., during installation) to achieve the desired occupancy detection outcome.

In some examples, occupancy analyzer 46 is applied to space 15 as a whole. In addition or alternatively, occupancy analyzer 46 is applied to each of the individual zones 16 of space 15.

The results of occupancy analyzer 46 are conveyed to occupancy indicator 48. Occupancy indicator 48 provides an output value 64 of one or zero, which represents occupied or unoccupied, respectively. An arrow 66 represents this information being conveyed to Zoning module 38. Zoning module 38, in some examples, may use the information to identify which zones 16 are occupied, if any, and/or whether space 15 is even occupied.

Figure 4:
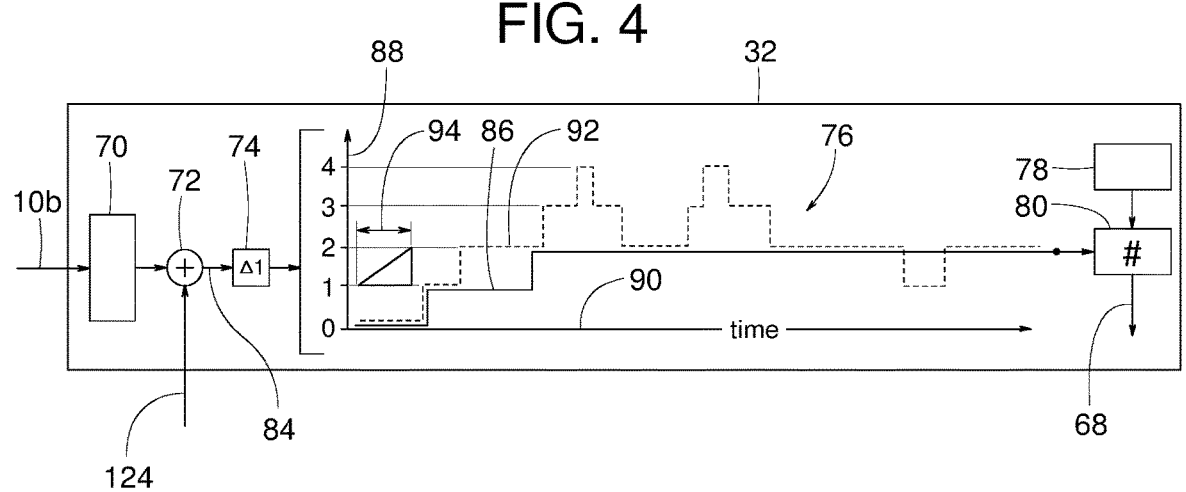
FIG. 4 is a schematic block diagram of an example People Count module used in some examples of a mmWave output analyzing system.

Referring to FIGS. 2 and 4, some examples of People Count module 32 are for determining a credible count value 68 that more accurately indicates the number of people in space 15. In some examples, credible count value 68 provides a people count figure that is more reliable and stable than the figure of raw count value 10b itself. Raw count value 10b, in some examples, may fluctuate rather erratically under many conditions.

To address this possible issue, some examples of People Count module 32 include a sampling block 70, a false negative compensator 72, a delta limiter 74, a people count analyzer 76, a false positive exception handler 78, and a credible count indicator 80. Sampling block 70 samples raw people count 10b as provided by mmWave sensor 12.

If mm Wave sensor 12 discontinues detecting a confirmed actual object, as determined by a false negative identifier 82 of Target Selection module 36, false negative compensator 72 adds the lost object to raw count value 10b to achieve a total count value 84. Total count value 84 is conveyed to delta limiter 74.

Delta limiter 74 limits a change rate in the total count value 84. The intent is to slow the response of people count analyzer 76. It is a way to effectively apply damping to people count analyzer 76.

The function of people count analyzer 76 is shown as a stepped solid line 86 with an amplitude that varies in discrete steps of whole numbers relative to a y-axis 88 versus a reference of time on an x-axis 90. A stepped dashed line 92 is a plot of the accumulated delta-ones received from delta limiter 74. In other words, in response to raw count value 10b and false negative compensator 72, delta limiter 74 drives the amplitude of dashed line 92 but does so at just one step at a time. Solid line 86 attempts to follow dashed line 92, but is damped or restricted to rise at a limited rate (e.g., up no more than one upward step every 10 to 30 seconds or so), as indicated by a time period 94 of one step.

The results of people count analyzer 76 (solid line 86) are conveyed to credible count indicator 80, which provides credible count value 68. In the illustrated example, credible count value 68 equals two. In some examples, false positive exception handler 78 adjusts credible count value 68 to compensate for a false positive exception. Next, credible count value 68, which accurately and calmly indicates the true people count in space 15, is conveyed to a credible targets identifier 96 of Target Selection module 36.

Figure 5:
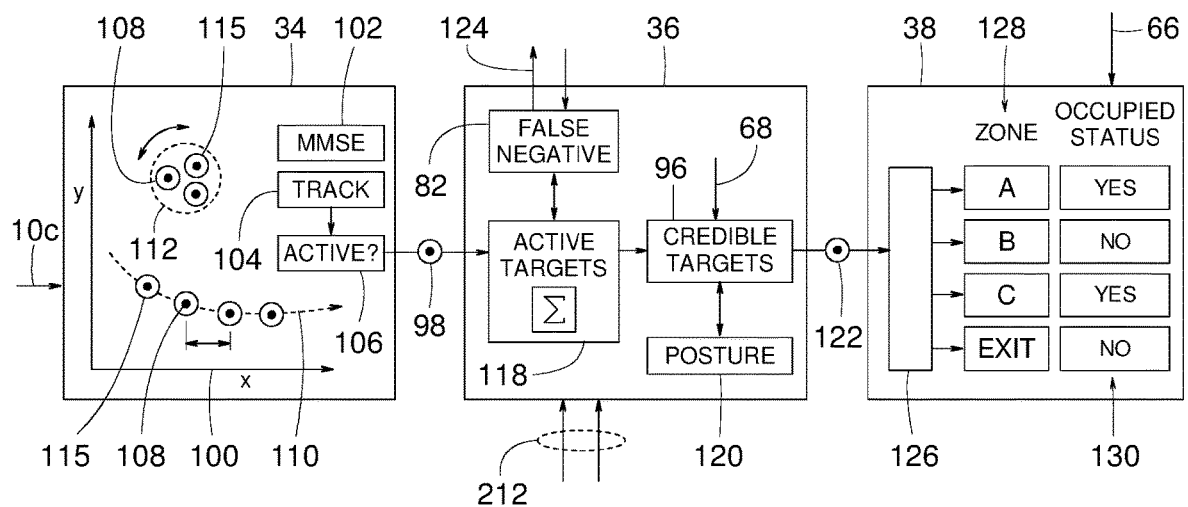
FIG. 5 is a schematic block diagram of an example Live Target Tracking module, an example Target Selection module, and an example Zoning module used in some examples of a mmWave output analyzing system.

Likely Target Tracking module 34, as shown in FIGS. 2 and 5, helps identify one or more possibly credible targets 98 in response to receiving object location signal 10c from mmWave sensor 12. In some examples, the identification of possibly credible targets 98 may be partially based on an apparent object's lifespan and/or movement. In some examples, Likely Target Tracking module 34 includes a coordinate system 100, an MMSE estimator 102 (minimum mean square error estimator), a target tracker 104, and an active decision maker 106. Some examples of Likely Target Tracking module 34 include a Kalman filter and model that considers velocity information (e.g., walking) for determining target positions more reliably. In some examples, target tracker 104 schematically represents implementing Kalman filtering to predict predetermined reasonable movement of one or more targets and/or their corresponding objects.

In some examples, coordinate system 100 corresponds to the layout of space 15 and/or zones 16. Based on object location signal 10c from mmWave sensor 12, one or more targets 115 corresponding to apparent objects 50 are placed on coordinate system 100. MMSE estimator 102 as applied to point clouds 22 helps identify a centerpoint 108 of each target 115.

Target tracker 104 monitors any movement or change in position of targets 115. Assigning targets 115 to objects 50 and then tracking the targets, rather than the objects directly, avoids mistaking one object for another. This can happen as objects 50 move around and switch places, while indoor radar sensor 12 only captures snapshots, rather than motion. For instance, if a detected object 50 and its corresponding target 115 are deemed credible, it would be bad if the credible object were later confused with the sudden appearance or relative movement of a false positive. If that false positive were to later disappear, the original credible object would then be lost as well. So, with the Likely Target Tracking module's use of targets 115, once a detected object 50 is identified as being a real actual object, assigning a target to the object helps ensure that the credible object is not mistakenly disregarded later.

In the illustrated example, a dashed line 110 might represent the movement of object 24 walking in zone-A, and a dashed line 112 might represent the movement of object 26 doing pushups in zone-C. In some examples, target tracker 104 determines whether targets 115 are exhibiting movement considered to be within a predetermined normal range for a real person (e.g., exhibiting at least some living movement but not traveling too fast). The rotational movement of ceiling fan 114 might be considered too fast for a human. If mmWave sensor 12 happens to detect a chair 116, the chair's lack of movement might also indicate that chair 116 is not a real person.

In response to target tracker 104 tracking the movement of targets 115 on coordinate system 100, decision maker 106 determines which of the one or more targets 115 are possibly credible targets 98 representing actual live objects. The decision is based on whether a target 115 is moving or traveling at less than a predetermined maximum speed. The one or more credible targets 98 chosen by decision maker 106 are conveyed to an active targets analyzer 118 of Target Selection module 36.

Target Selection module 36, as shown in FIGS. 2 and 5, helps pick the most likely credible targets 98. In some examples, Target Selection module 36 may include active target analyzer 118, a posture analyzer 120, credible targets identifier 96 and false negative identifier 82. Some examples of active targets analyzer 118 assigns a confidence score to each possibly credible target 98 that was identified in Likely Target Tracking module 34. In some examples, the confidence score (alive credit) is based on the lifespan or length of time the possibly credible targets corresponding apparent object was being detected. In some examples where an apparent object appeared and was detected intermittently, the confidence score is a sum total or cumulative value of those intermittent periods of time. Active target analyzer 118 assigns a higher confidence scores to possibly credible targets 98 that have a greater lifespan or accumulated lifespan.

Based on the highest confidence scores, credible targets identifier 96 starts selecting possibly credible targets 98 and declares them to be credible targets 122 up until the number of selected credible targets 122 reaches the credible count value 68 determined in People Count module 32. In other words, the credible count value 68 comprises the credible targets 122 having the highest confidence scores.

In some examples, posture analyzer 120 determines the orientation of the objects 50 corresponding to the credible targets 122 identified by credible target identifier 96. In some examples, posture analyzer 120 determines an object's orientation based on the shape of point clouds 22. In some examples, posture analyzer 120 assigns posture values representing the likelihood that a particular object 50 is standing, sitting, and lying down. In some examples, the posture values having the highest score or greatest likelihood of representing the true posture is then determined to be the correct posture. In some examples, the posture information on each of the credible targets 122 may be conveyed directly from posture analyzer 120 to Zoning module 38 and/or first shared with credible targets identifier 96.

In some examples, false negative identifier 82 of Target Selection module 36 communicates with active target analyzer 118 of Target Selection module 36 and point cloud data base 42 of Occupancy module 30. The communication helps identify a credible target with a high confidence score, wherein the credible target's corresponding object may have momentarily avoided detection by mmWave sensor 12. To ensure that the credible object is not abandoned and disregarded in such a case, false negative identifier 82 adds a "one" to false negative compensator 72 of People Count module 32, thereby keeping the momentarily missing object still in consideration. An arrow 124 represents false negative identifier 82 sending a "one" to false negative compensator 72.

In some examples, Zoning module 38 provides more detailed information on credible targets and their corresponding credible objects (e.g., objects 24 and 26). Examples of such information include individual zone occupancy, location of credible objects (e.g., objects 24 and 26) within a zone, and/or posture of credible objects (e.g., objects 24 and 26). In some examples, however, information on posture is determined by posture analyzer 120 in Target Selection module 36.

In some examples, Zoning module 38 may include a coordinates converter 126, a zone identifier 128, and a zone occupancy indicator 130. Some examples of coordinates converter 126 convert the coordinates of objects location signal 10*c* to a local coordinate system that matches the physical layout of space 15 and its various zones 16. This helps in aligning credible targets 122 with zones 16. Zone identifier 128 in some examples, may assign different degrees of damping to different zones 16. In some examples, the damping is applied to the descending (unloading) portions of curve 54 of occupancy analyzer 30 and is applied on an individual zone basis as opposed to the entire space 15. Occupancy indicator 48 of Occupancy module 30 can then be used as a source of information for determining whether zone occupancy indicator 130 should declare whether individual zones 16 are occupied or unoccupied.

Figure 6:
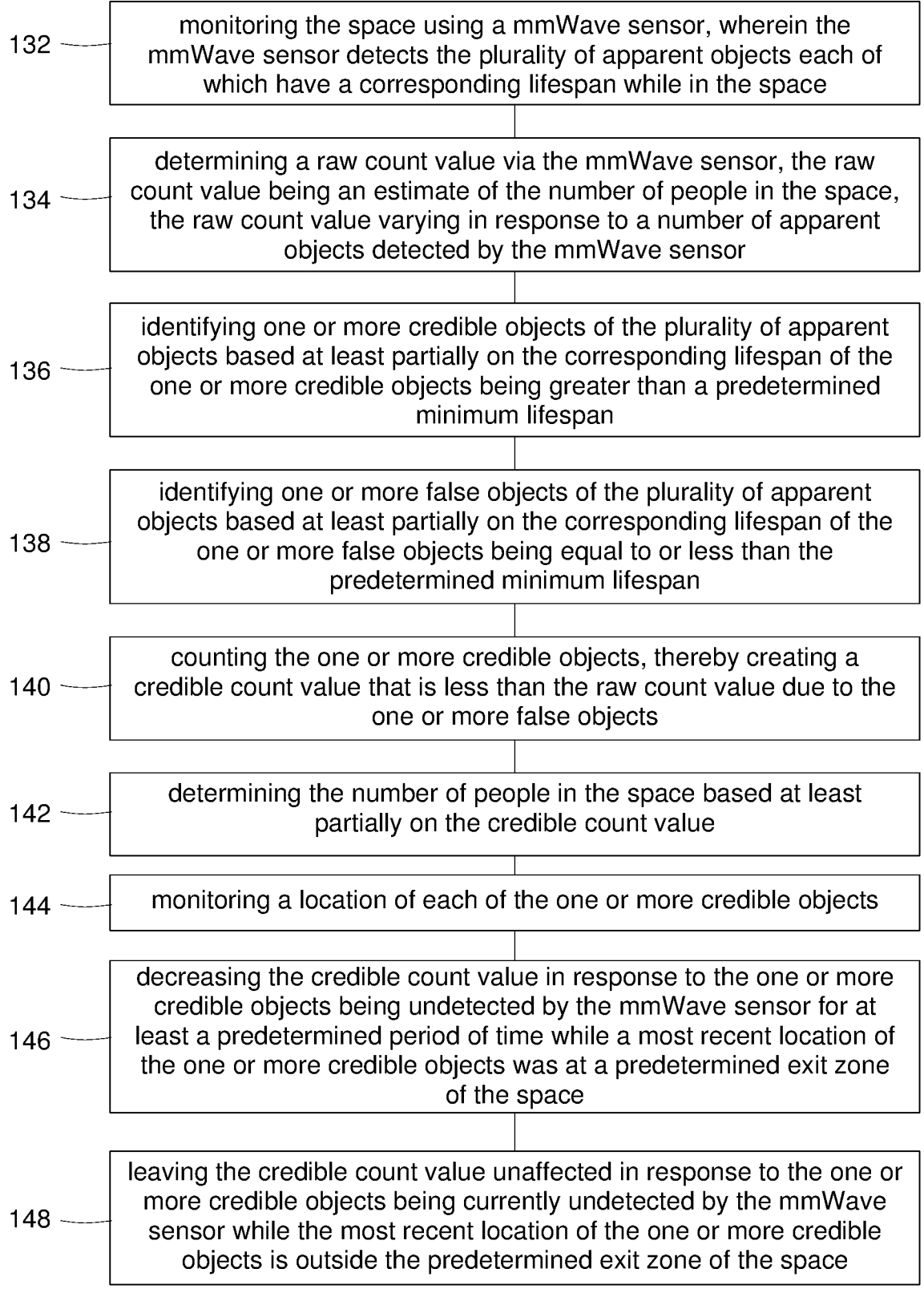
FIG. 6 is a flow diagram showing an example method for determining a number of people in a space.

FIG. 6 is a flow diagram illustrating some example steps of an example method for determining a number of people in space 15. In some examples, a block 132 may be performed by mm Wave sensor 12; a block 134 may be performed by mmWave sensor 12; a block 136 may be performed by at least one of mmWave sensor 12, Occupancy module 30 and People Count module 32; a block 138 may be performed by at least one of mmWave sensor 12, Occupancy module 30 and People Count module 32; a block 140 may be performed by People Count module 32; a block 142 may be performed by People Count module 32; a block 144 may be performed by mmWave sensor 12; a block 146 may be performed by at least one of mmWave sensor 12, People Count module 32, and Likely Target Tracking module 34; and a block 148 may be performed by People Count module 32.

Figure 7:
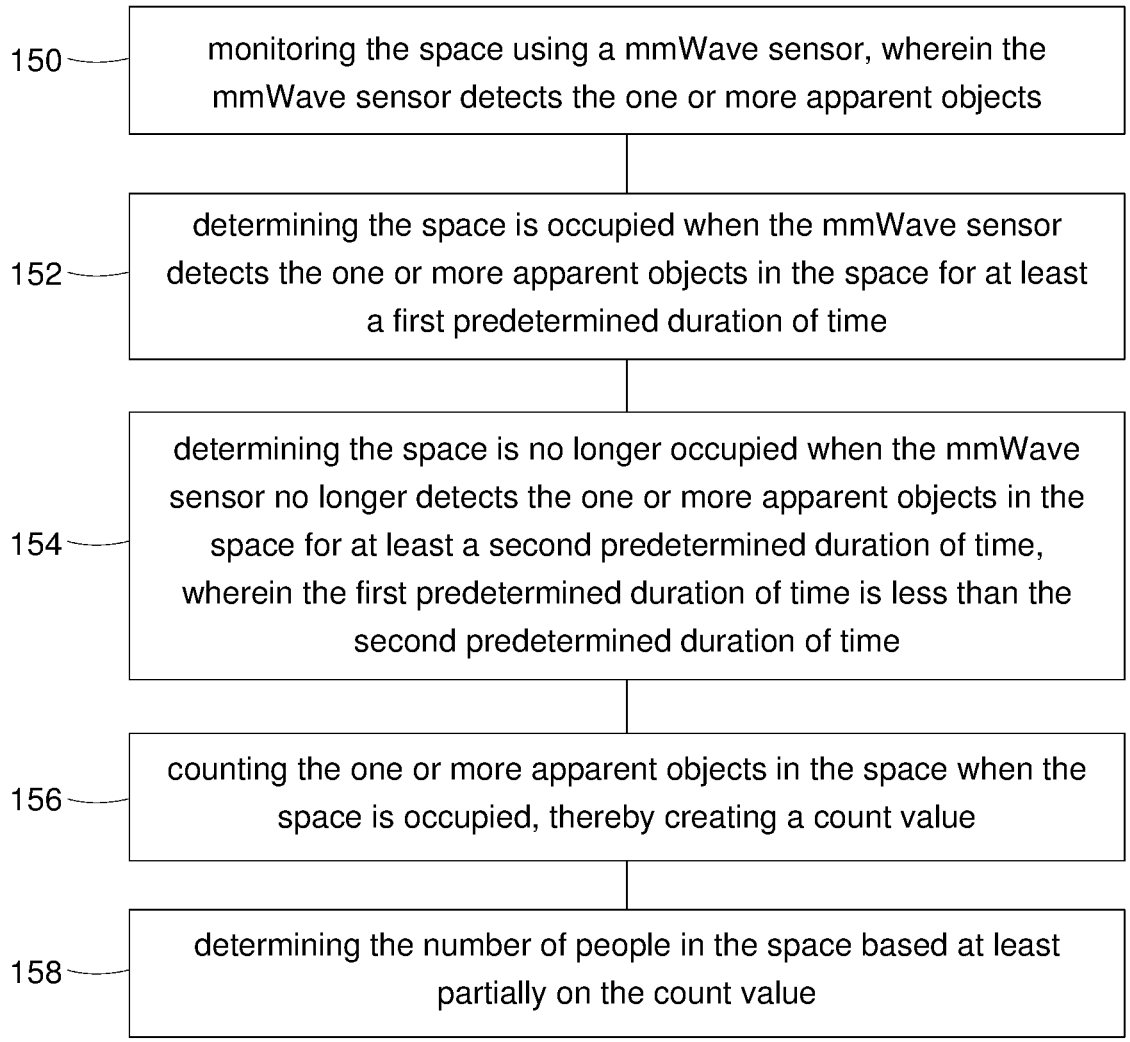
FIG. 7 is a flow diagram showing another example method for determining a number of people in a space.

FIG. 7 is a flow diagram illustrating some example steps of another example method for determining a number of people in space 15. In some examples, a block 150 may be performed by mmWave sensor 12; a block 152 may be performed by Occupancy module 30; a block 154 may be performed by Occupancy module 30; a block 156 may be performed by People Count module 32; and a block 158 may be performed by People Count module 32.

FIG. 8 is a flow diagram illustrating some example steps of another example method for determining a number of people in space 15. In some examples, a block 160 may be performed by mmWave sensor 12; a block 162 may be performed by mmWave sensor 12; a block 164 may be performed by People Count module 32; a block 166 may be performed by People Count module 32; a block 168 may be performed by People Count module 32; a block 170 may be performed by Likely Target Tracking module 34; a block 172 may be performed by mmWave sensor 12; a block 174 may be performed by Likely Target Tracking module 34; a block 176 may be performed by mmWave sensor 12; a block 178 may be performed by Likely Target Tracking module 34; a block 180 may be performed by Likely Target Tracking module 34; a block 182 may be performed by Target Selection module 36; and a block 184 may be performed by Target Selection module 36;

FIG. 9 is a flow diagram illustrating some additional example steps of an example method for determining a number of people in space 15. In some examples, a block 186 may be performed by at least one of People Count module 32, mmWave sensor 12, and possible feedback 212 from sensor 214 and/or 216; a block 188 may be performed by at least one of People Count module 32, mmWave sensor 12, and possible feedback 212 from sensor 214 and/or 216; a block 190 may be performed by at least one of Likely Target Tracking module 34 and Target Selection module 36; a block 192 may be performed by Target Selection module 36; a block 194 may be performed by Target Selection module 36; a block 196 may be performed by Target Selection module 36; a block 198 may be performed by at least one of Occupancy module 30 and Target Selection module 36; and a block 200 may be performed by at least one of Occupancy module 30 and Target Selection module 36.

Figure 10:
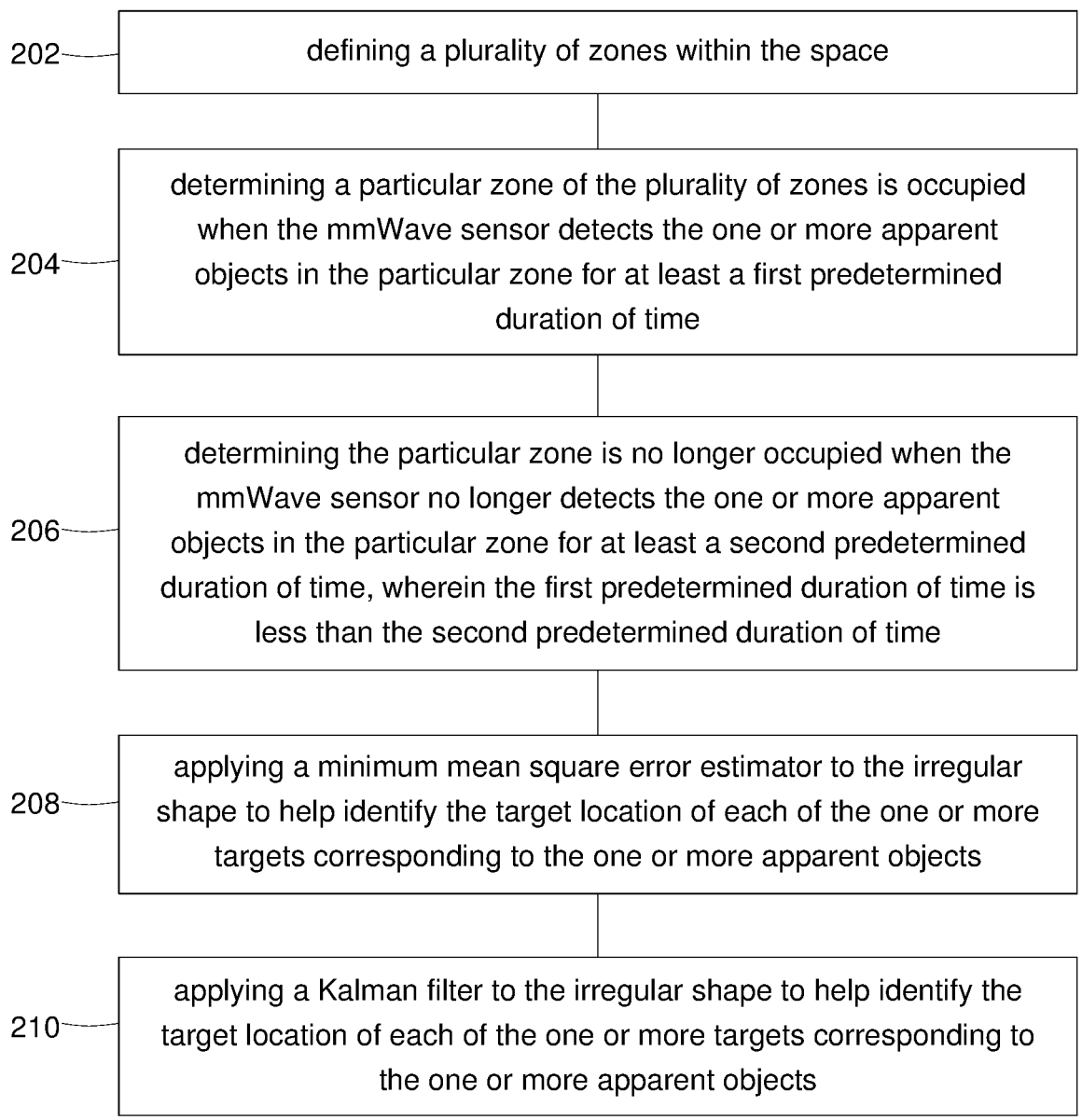
FIG. 10 is a flow diagram showing additional method steps for determining a number of people in a space.

FIG. 10 is a flow diagram illustrating some additional example steps of an example method for determining a number of people in space 15. In some examples, a block 202 may be performed by at least one a user, mmWave detector 12 and Likely Target Tracking module 34; a block 204 may be performed by Occupancy module 30; a block 206 may be performed by Occupancy module 30; a block 208 may be performed by at least one of Likely Target Tracking module 34, mmWave sensor 12, and Occupancy module 30; and a block 210 may be performed by at least one of Likely Target Tracking module 34, mmWave sensor 12, and Occupancy module 30.

FIG. 11 is a flow diagram illustrating some example steps of an example method for determining a number of people in space 15. In some examples, a block 220 may be performed by mm Wave sensor 12; a block 222 may be performed by at least one of mmWave sensor 12, Occupancy module 30, People Count module 32, Likely Tracking module 34, and Target Selection module 36; a block 224 may be performed by at least one of Occupancy module 30, People Count module 32, Likely Tracking module 34, and Target Selection module 36; and a block 226 may be performed by at least one of mmWave sensor 12, Occupancy module 30, People Count module 32, Likely Tracking module 34, and Target Selection module 36.

In some examples, computer 28 may include a non-transitory computer readable medium that contains instructions or program codes that when executed by computer 28 causes computer 28 to perform one or more of the method steps shown in FIGS. 6-10. The term, "computer readable medium" refers to any device for storing information for any duration (e.g., for extended time periods, permanently, for brief instances, for temporarily buffering, for caching of the information, etc). The term, "program code" refers to executable instructions (e.g., computer readable instruction, machine readable instructions, software, etc.). The term, "non-transitory computer readable medium" is specifically defined to include any type of computer readable storage device and/or storage disk and to exclude propagating signals and to exclude transmission media.

In some examples, People Count module 32 decreases credible count value 68 in response to a credible object being undetected by mmWave sensor 12 for at least a predetermined period of time while a most recent location of the credible object was at a predetermined exit zone (e.g., exit zone 16*e*). In some examples, mmWave sensor 12 and/or Likely Target Tracking module 34 determines whether the object was at exit zone 16*c*. In addition or alternatively, in some examples, sensor fusion is applied to ascertain whether an object was at exit zone 16*e*. For instance, in some examples, signals 212 from an auxiliary sensor such as a door knob sensor 214 and/or a body detector 216 determines whether the object was at exit zone 16*e*. Body detector 216 is schematically illustrated to represent any type of sensor for detecting a body at exit zone 16*e*. Some examples of body detector 16*e* include a pressure sensitive floor mat, an electric eye, an infrared sensor, a limit switch on a door 218, etc. Detecting a body at exit zone 16*e*, sensing a body via an electric eye or infrared sensor, a limit switch on door 218 are each examples of providing signal 212 that varies in response to a certain condition changing in response to an action of one or more credible objects. In some examples, mmWave sensor 12 is reconfigured to detect door 218 swinging into sensing range of mmWave sensor 12. In some examples, system 14 determines a previously detected object is no longer in space 15 if the object has not been detected for an extended period (e.g., several minutes or hours), regardless of whether the object was ever detected near exit zone 16e.

In some examples, internal algorithms of mmWave sensor 12 include sensitivity variables that determine the sensor's ability to disregard false positives (ghosts) and false negatives (lost detection of real objects). In some examples, adjusting the sensitivity variables to reduce the sensor's mistaken detection of false positives may, unfortunately, increase the sensor's mistaken identification of false negatives, and vice versa. This relationship is depicted by a line 230 in FIG. 12.

In some examples, the values of the mm Wave sensor's internal variables determine where on line 230 sensor 12 operates. In some examples, mmWave sensor 12 operates at an operating point 232, which provides a moderate percentage of false positives and false negatives. Adjusting the mm Wave sensor's internal variables to shift point 232 in a direction 234 along line 230 decreases the sensor's percentage of lost detections that are false but increases its percentage of positive detections that are false. Conversely, adjusting the internal variables to shift point 232 in a direction 236 along line 230 decreases the mmWave sensor's percentage of positive detections that false but increases its percentage of lost detections that are false.

Some end users might have applications where reducing the number of false negatives is more important than the number of false positives. Just the opposite might be true for other users. Consequently, in some examples, the manufacturer or supplier of mmWave sensor 12 may adjust the sensor's internal variables as a way of tuning sensor 12 to meet certain end-use applications. For example, the manufacturer of mm Wave sensor 12 might hardcode sensor 12 to operate at some point along line 230 other than at point 232.

In addition or alternatively, some examples of mmWave sensor 4 include a means for receiving an input signal 238 from the end user, wherein input signal 238 determines or adjusts the sensor's internal variables. Input signal 238 thus provides a way for the end user to decide where operating point 232 lies along line 230, so mm Wave sensor 12 can more closely meet the needs of the end user.

In some examples, input signal 238 is in the form of a user-selectable value (e.g., one to ten, or A to Z, etc.) or a command (e.g., a low false positives setting, a low false negatives setting, an average medium setting, high sensitivity, low sensitivity, etc.). In some examples, the user can change input signal 238 during normal or test operation, so end user 4 can immediately see the impact or results of changing input signal 238.

Figure 12:
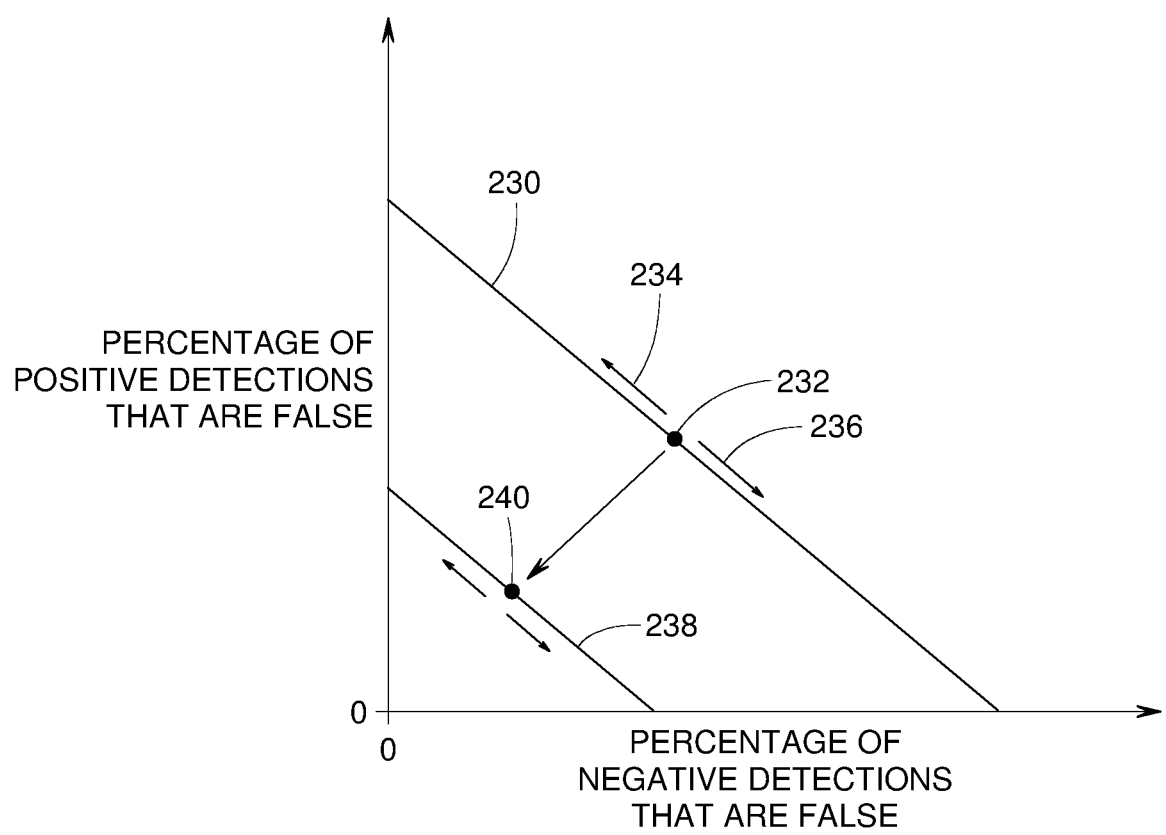
FIG. 12 is a graph show example relationships of false positives versus false negatives.

A line 238 of FIG. 12 shows the overall improved relationship of false positives to false negatives when some examples of mmWave output analyzing system 14 are applied to the raw data from mmWave sensor 12. In the illustrated example, when mmWave output analyzing system 14 is applied to an example mmWave sensor 12 operating at point 232, the resulting point of operation of system 14 is at an operating point 240 on line 238. Adjusting the mmWave sensor's internal variables via input 228, such that the sensor's operating point 232 shifts in direction 234 or 236, may result in a corresponding shift in point 240 along line 238 in direction 240 or 238, respectively.

The term, "object location" refers to the general coordinates of a detected object, wherein the general coordinates are provided by a mmWave sensor. The term, "target location" refers to the coordinates of a user-defined target corresponding to a detected object, wherein the coordinates of the user-defined target are based on the coordinates of the object but with some transformation to fit a map of a particular space being monitored. The terms "volatile" and "volatility" are measures of a variable's range of change or standard deviation.

Some example methods for identifying a number of people in a space can be defined as follows:

Example-1 A method for identifying a number of people in a space, comprising:
    monitoring the space using a mm Wave sensor, wherein the mm Wave sensor identifies one or more sensed objects and a corresponding location for each of the one or more sensed objects at each of a plurality of times;
    defining one or more targets in the space based on the one or more sensed objects and the corresponding location for each of the one or more sensed objects at each of the plurality of times;
    assigning each of the one or more sensed objects at each of the plurality of times to one of one or more of the defined targets;
    determining which of the defined targets are ghost targets and which are live targets; and
    determine the number of people in the space based on the live targets.

Example-2 The example of Example-1 further comprising:
    determining when the one or more sensed objects and the corresponding location for each of the one or more sensed objects are no longer being assigned to a particular live target, and in response:
    determine when the particular live target likely left the space, and then maintaining the particular live target when determining the number of people in the space; and
    determine when the particular live target is likely still in the room, resulting in a likely false negative reading, and then maintaining the particular live target when determine the number of people in the space.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A method for determining a number of people in a space, the method comprising:
    monitoring the space using a mmWave sensor, wherein the mmWave sensor detects each of one or more apparent objects in the space each of which has a corresponding detection duration while in the space;
    identifying one or more false objects of the one or more apparent objects based at least partially on the corresponding detection duration of the one or more false objects being equal to or less than a predetermined minimum detection duration;
    determining a credible object count of one or more credible objects of the apparent objects, the credible object count is representative of a number of the apparent objects in the space that are not identified as one or more of the false objects; and
    determining the number of people in the space based at least partially on the credible object count.

2. The method of claim 1, comprising:
monitoring a condition associated with the space using an auxiliary sensor that is different from the mmWave sensor, wherein the condition is responsive to an action of one or more of the credible objects; and
using sensor fusion to fuse information from the mmWave sensor and the auxiliary sensor when determining the number of people in the space.

3. The method of claim 1, further comprising:
monitoring a location of each of the one or more credible objects while each of the one or more credible objects remain within the space;
decreasing the credible object count in response to the one or more credible objects being undetected in the space by the mmWave sensor for at least a predetermined period of time while a most recent location of the one or more credible objects was in a predetermined exit zone of the space; and
leaving the credible object count unaffected in response to the one or more credible objects being currently undetected in the space by the mmWave sensor while the most recent location of the one or more credible objects is within the space but outside the predetermined exit zone of the space.

4. The method of claim 1, wherein the corresponding detection duration of a particular apparent object is a cumulative value of a plurality of momentary detection durations of the particular apparent object in the space.

5. The method of claim 1, wherein when a particular apparent object is detected momentarily a plurality of times in the space each for a corresponding momentary detection duration, the corresponding detection duration for that particular apparent object is representative of a cumulative value of the corresponding momentary detection durations of the particular apparent object.

6. A system for determining a number of people in a space, the system comprising:
an indoor radar sensor for detecting objects in the space;
a controller operatively coupled to the indoor radar sensor, the controller configured to:
monitor an output of the indoor radar sensor;
detect each of one or more apparent objects in the space based on the output of the indoor radar sensor;
determine for each of the one or more apparent objects detected in the space a corresponding object detection duration while in the space;
determine when one or more of the apparent objects in the space corresponds to a ghost object that is not actually present in the space;
determine the number of people in the space based at least partially on:
a number of the one or more apparent objects in the space; and
a number of apparent objects that are determined to be ghost objects.

7. The system of claim 6, wherein to determine when one or more of the apparent objects corresponds to a ghost object, the controller is configured to:
determine which of the one or more of the apparent objects in the space have an object detection duration that is less than a predetermined detection duration threshold.

8. The system of claim 6, wherein to determine when one or more of the apparent objects corresponds to a ghost object, the controller is configured to:
track a speed of movement of each of the one or more of the apparent objects while in the space; and
determine which of the one or more of the apparent objects have had a speed of movement that is above a predetermined maximum speed threshold.

9. The system of claim 6, wherein the controller is configured to:
allow the determined number of people in the space to increase faster than the determined number of people is allowed to decrease.

10. The system of claim 6, wherein the controller is configured to:
determine when an object that is actually present in the space no longer has a corresponding apparent object detected by the indoor radar sensor; and
determining the number of people in the space based at least partially on a number of objects that are determined to be actually present in the space but no longer have a corresponding apparent object.

11. The system of claim 10, wherein to determine when an object that is actually present in the space no longer has a corresponding apparent object detected by the indoor radar sensor, the controller is configured to:
assign a confidence score to each of the one or more apparent objects that are detected by the indoor radar sensor to be in the space, wherein the confidence score is dependent at least in part on the object detection duration of the corresponding apparent object; and
determine that an object is actually present in the space even though the object no longer has a corresponding apparent object detected by the indoor radar sensor when the object has a confidence score that is above a confidence score threshold.

12. The system of claim 6, wherein the controller is configured to:
identifying a coordinate location of each of the number of people determined to be in the space; and
correlate the coordinate location of each of the number of people determined to be in the space to one of a plurality of defined zones of the space.

13. The system of claim 12, wherein the controller is configured to identify which of the plurality of defined zones of the space are currently occupied by at least one person.

14. The system of claim 12, wherein the controller is configured to identify a count of people in each of the plurality of defined zones of the space.

15. The system of claim 6, wherein the controller is configured to:
determine the space is occupied when the controller determines the number of people in the space is greater than zero for at least a first predetermined duration of time; and
determine the space is no longer occupied when the controller determines the number of people in the space is zero for at least a second predetermined duration of time, wherein the first predetermined duration of time is less than the second predetermined duration of time.

16. The system of claim 6, wherein the controller is configured to:
monitor the output of the indoor radar sensor at a first rate; and
determine the number of people in the space at a second rate, where the first rate is more than twice as fast as the second rate.

17. A method for determining a number of people in a space, the method comprising:
monitoring the space using an indoor radar sensor, wherein the indoor radar sensor detects each of one or more apparent objects in the space and each of the one or more apparent objects are tracked while remaining in the space;
determining the space is occupied when at least one of the one or more apparent objects are detected by the indoor radar sensor and are determined to remain in the space for at least a first predetermined duration of time;
determining the space is no longer occupied when no apparent objects are detected by the indoor radar sensor to be in the space for at least a second predetermined duration of time, wherein the first predetermined duration of time is less than the second predetermined duration of time; and
determining and reporting the number of people in the space.

18. The method of claim 17, wherein determining the number of people in the space comprises:
determining when one or more of the apparent objects corresponds to a ghost object that is not actually present in the space;
determining when an object that is actually present in the space no longer has a corresponding apparent object;
determining the number of people in the space based at least partially on:
a number of apparent objects that are determined to be ghost objects; and
a number of apparent objects that are determined to be actually present in the space but no longer have a corresponding apparent object.

19. The method of claim 18, wherein determining when an object that is actually present in the space no longer has a corresponding apparent object comprises:
assigning a confidence score to each of the one or more apparent objects, wherein the confidence score is dependent at least in part on how long the corresponding apparent object has been detected by the indoor radar sensor; and
determining that an object is actually present in the space even though the object no longer has a corresponding apparent object detected by the indoor radar sensor when the object has a confidence score that is above a confidence score threshold.

20. The method of claim 17, further comprising:
identifying a coordinate location of each of the number of people determined to be in the space;
correlate the coordinate location of each of the number of people determined to be in the space to one of a plurality of defined zones of the space; and
indicating which of the plurality of defined zones are occupied.

* * * * *